US008649323B2

(12) United States Patent
Iwamura et al.

(10) Patent No.: US 8,649,323 B2
(45) Date of Patent: Feb. 11, 2014

(54) LOGICAL INTERFACE ESTABLISHING METHOD, RADIO BASE STATION, AND COMMUNICATION MANAGEMENT APPARATUS

(75) Inventors: Mikio Iwamura, Yokohama (JP); Takehiro Nakamura, Yokohama (JP); Yasuhiro Kato, Yokohama (JP); Yoshitsugu Shimazu, Kawasaki (JP); Masayuki Motegi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 876 days.

(21) Appl. No.: 12/522,923

(22) PCT Filed: Dec. 21, 2007

(86) PCT No.: PCT/JP2007/074731
§ 371 (c)(1),
(2), (4) Date: Jul. 24, 2009

(87) PCT Pub. No.: WO2008/087833
PCT Pub. Date: Jul. 24, 2008

(65) Prior Publication Data
US 2010/0046433 A1 Feb. 25, 2010

(30) Foreign Application Priority Data
Jan. 17, 2007 (JP) .................................. 2007-008541

(51) Int. Cl.
*H04W 4/00* (2009.01)
(52) U.S. Cl.
USPC .......................................... 370/328; 370/329
(58) Field of Classification Search
USPC ................................................ 370/328, 329
See application file for complete search history.

(56) References Cited

U.S. PATENT DOCUMENTS

| 6,308,267 | B1 * | 10/2001 | Gremmelmaier | 713/168 |
| 2003/0003906 | A1 * | 1/2003 | Demers et al. | 455/424 |
| 2004/0008657 | A1 * | 1/2004 | Lee et al. | 370/342 |
| 2005/0099972 | A1 * | 5/2005 | Motegi et al. | 370/328 |
| 2006/0067232 | A1 * | 3/2006 | Lee et al. | 370/235 |

(Continued)

FOREIGN PATENT DOCUMENTS

| JP | 2004-260445 A | 9/2004 |
| JP | 2004-274174 A | 9/2004 |
| JP | 2004-304394 A | 10/2004 |
| JP | 2006-261880 A | 9/2006 |

OTHER PUBLICATIONS

Japanese Office Action for Patent Application No. 2007-008541; Mailing date Dec. 7, 2010 (5 pages).

(Continued)

*Primary Examiner* — Brandon Renner
*Assistant Examiner* — Kadzovi Acolatse
(74) *Attorney, Agent, or Firm* — Osha Liang LLP (57) ABSTRACT

A plug-and-play radio base station autonomously establishes X2 logical interfaces and S1 logical interfaces with existing base stations and upper nodes. A new radio base station which is installed in a network advertises an IP address of the new radio base station over a transport network. An existing radio base station or an upper node which receives the IP address detects the number of hops from the new radio base station to the existing radio base station or the upper node. An initial logical interface with the new radio base station is established when the detected number of hops is below a predetermined threshold.

7 Claims, 8 Drawing Sheets

(56) References Cited

U.S. PATENT DOCUMENTS

2006/0215583 A1* 9/2006 Castagnoli .................. 370/254
2007/0254667 A1* 11/2007 Jokinen ........................ 455/436
2008/0080399 A1* 4/2008 Wang et al. .................. 370/254

OTHER PUBLICATIONS

International Search Report w/translation from PCT/JP2007/074731 dated Mar. 18, 2008 (5 pages).
Written Opinion from PCT/JP2007/074731 dated Mar. 18, 2008 (4 pages).
Stoica, I. et al.; "Internet Indirection Infrastructure"; ACM SIGCOMM Computer Communication Review, vol. 32, ACM; Oct. 2002; pp. 73-86, ISSN 0146-4833 (15 pages).
3GPP TSG RAN WG2 Ad Hoc on LTE; R2-061929; Standardisation Policy for Plug and Play RAN; "Overview of PnP and Self-Optimisation"; Cannes, France; Jun. 27-30, 2006 (4 pages).
Hosono, H. et al.; "Automatic Initial Parameter Determination for Newly Installing Base Stations in Mobile Communication Systems"; Idotai Tsushin System ni Okeru Shinsetsu Ido Kichikyoku no Shoki Parameter Jido Ketteiho no Teian; IEICE Technical Report, vol. 106, No. 168, The Institute of Electronics, Information and Communication Engineers; Jul. 12, 2006; pp. 145-150, RCS2006-83 (8 pages).

* cited by examiner

LOGICAL INTERFACE ESTABLISHING METHOD, RADIO BASE STATION, AND COMMUNICATION MANAGEMENT APPARATUS

TECHNICAL FIELD

The present invention generally relates to a configuration of a communication network. The present invention specifically relates to a technology for autonomously establishing logical interfaces between a new plug-and-play radio base station (PnP eNB) and an upper node and between the new PnP eNB and existing neighboring eNBs, when the new PnP eNB is installed in a network.

BACKGROUND ART

Every time a new node is installed in a network, an operator conventionally determines an upper node or neighboring base stations to be connected to the new node and manually configures settings. However, manual installation of the new node by the operator is not desirable because of complicated procedures and high costs.

For this reason, a network configuration technology is needed for establishing logical connections (logical interfaces) between the new node and neighboring base stations and between the new node and the upper node (communication management apparatus) by means of autonomous operations by the new node after the new node is installed with minimum efforts.

In order to achieve such a network configuration technology, guidelines for a radio access network are proposed, where logical connections are autonomously established when a plug-and-play (PnP) radio station is cable-connected to the network (see "Standardization policy for plug and play RAN", R2-061929, 3GPP TSG RAN WG2 Ad Hoc on LTE, 27-30 Jun. 2006, Cannes, France, for example). According to the proposed guidelines, when the PnP radio base station (eNB) is powered on, the eNB establishes an initial connection to an OAM (Operation, Administration and Maintenance) server using the dynamically-provided own IP address, the gateway address, and the DNS server address. Then, the eNB receives necessary information for participating in the network from the OAM server. Then, the eNB automatically connects to an optimum upper node (MME/UPE: Mobile Management Entity/User Plane Entity). After the end of basic setup procedures in this manner, radio parameters are configured.

DISCLOSURE OF INVENTION

Problem(s) to be Solved by the Invention

However, the proposed guidelines do not specify how to autonomously establish logical interfaces between the new eNB and the upper node (MME/UPE) and between the new eNB and neighboring eNBs.

Furthermore, according to the proposed guidelines, it is necessary for the new eNB to access the OAM server to receive necessary information for participating in the network from the OAM server.

In view of the above-mentioned related art, it is a general object of the present invention to provide a method of automatically establishing logical interfaces between a new plug-and-play radio base station (PnP eNB) and an upper node (communication management apparatus) and between the new PnP eNB and existing neighboring eNBs, when the new PnP eNB is installed in a network.

It is another general object of the present invention to provide a radio base station (eNB) and an upper communication management apparatus (MME/UPE, for example) which can establish such logical interfaces.

Means for Solving the Problem(s)

In a first aspect of the present invention, there is provided a logical interface establishing method, including:
(a) by a new radio base station which is installed in a network, advertising an IP address of the new radio base station over a transport network;
(b) by an existing radio base station or an upper node which receives the IP address, detecting the number of hops from the new radio base station to the existing radio base station or the upper node; and
(c) establishing an initial logical interface with the new radio base station, when the detected number of hops is below a predetermined threshold.

In a second aspect of the present invention, there is provided a logical interface establishing method, including:
(a) from a new radio base station which is installed in a network, wirelessly transmitting a broadcast signal for a notification of existence of the new radio base station;
(b) by a mobile terminal which receives the broadcast signal, measuring radio quality for the new radio base station;
(c) transmitting a measurement result and radio identification information of the new radio base station included in the broadcast signal from the mobile terminal to an existing radio base station;
(d) by the existing radio base station, converting the radio identification information of the new radio base station into an IP address; and
(e) establishing a logical interface between the new radio base station and an upper node based on the IP address.

In a third aspect of the present invention, there is provided a radio base station, including:
a transceiving unit configured to advertise an IP address of the radio base station over a transport network upon participating in a network and to receive logical interface information retained by an existing radio base station or an upper node from the existing radio base station or the upper node via the transport network;
a logical interface information generating unit configured to generate logical interface information for the radio base station based on the received logical interface information; and
a logical interface establishing unit configured to establish an additional logical interface with a existing radio base station or an upper node other than the existing radio base station or the upper node which transmits the logical interface information based on the generated logical interface information.

In a fourth aspect of the present invention, there is provided a radio base station, including:
a transceiving unit configured to receive an IP address of a new radio base station which participates in a network via a transport network;
a hop number determining unit configured to detect the number of hops to the new radio base station based on the IP address and to determine whether the number of hops is below a predetermined threshold; and a logical interface establishing unit configured to establish a logical interface with the new radio base station, when the number of hops is below the predetermined threshold.

In a fifth aspect of the present invention, there is provided a radio base station, including:
 a broadcast signal generating unit configured to generate a broadcast signal for a notification of existence of the radio base station upon participating in a network;
 a first transceiving unit configured to wirelessly transmit the broadcast signal;
 a second transceiving unit configured to receive upper node information from an existing radio base station via a wired network; and
 a logical interface establishing unit configured to establish a logical interface with an upper node based on the upper node information.

In a sixth aspect of the present invention, there is provided a radio base station which is operable based on information from a mobile station, including:
 a first transceiving unit configured to wirelessly receive radio identification information of a new radio base station which participates in a network and radio quality measurement information from a mobile station;
 an IP address retrieving unit configured to convert the radio identification information into an IP address; and
 a second transceiving unit configured to transmit upper node information retained by the radio base station to the new radio base station based on the IP address.

In a sixth aspect of the present invention, there is provided a radio base station which is operable based on information from a mobile station, including:
 a first transceiving unit configured to wirelessly receive radio identification information of a new radio base station which participates in a network and radio quality measurement information from a mobile station;
 an IP address retrieving unit configured to convert the radio identification information into an IP address; and
 a second transceiving unit configured to transmit upper node information retained by the radio base station to the new radio base station based on the IP address.

In a eighth aspect of the present invention, there is provided a communication management apparatus, including:
 a logical interface retaining unit configured to retain logical interface information used within a same pool;
 a transceiving unit configured to receive an IP address of a new radio base station which participates in a network via a transport network;
 a hop number determining unit configured to detect the number of hops to the new radio base station and to determine whether the number of hops is below a predetermined threshold; and
 a logical interface establishing unit configured to establish a logical interface with the new radio base station, when the number of hops is below the predetermined threshold.

Advantageous Effect of the Invention

According to an embodiment of the present invention, when a new eNB participates in a network, operator's decisions and manual configurations for logical interfaces can be alleviated.

In addition, autonomous operations between the new eNB and existing eNBs allow for optimum and extensive configurations of logical interfaces.

DETAILED DESCRIPTION OF THE PREFERRED EMBODIMENTS

Description of Notations 10 radio base station (eNB)
11 transceiving unit
11a CN transceiving unit
11b radio transceiving unit
12 statistical processing unit
13 neighboring list/S1 interface list generating unit (logical interface information generating unit)
14 neighboring list/S1 interface list retaining unit
15 hop number determining unit
15a hop number threshold changing unit
16 X2 interface establishment protocol processing unit (logical interface establishing unit)
17 S1 interface establishment protocol processing unit (logical interface establishing unit)
18 broadcast signal generating unit
19 IP address retrieving unit
20 upper node (MME/UPE or communication management apparatus)
21 transceiving unit
22 instruction controlling unit
24 intra-pool MME/UPE list and eNB list retaining unit
25 hop number determining unit
25a hop number threshold changing unit

BEST MODE OF CARRYING OUT THE INVENTION

Figure 1:
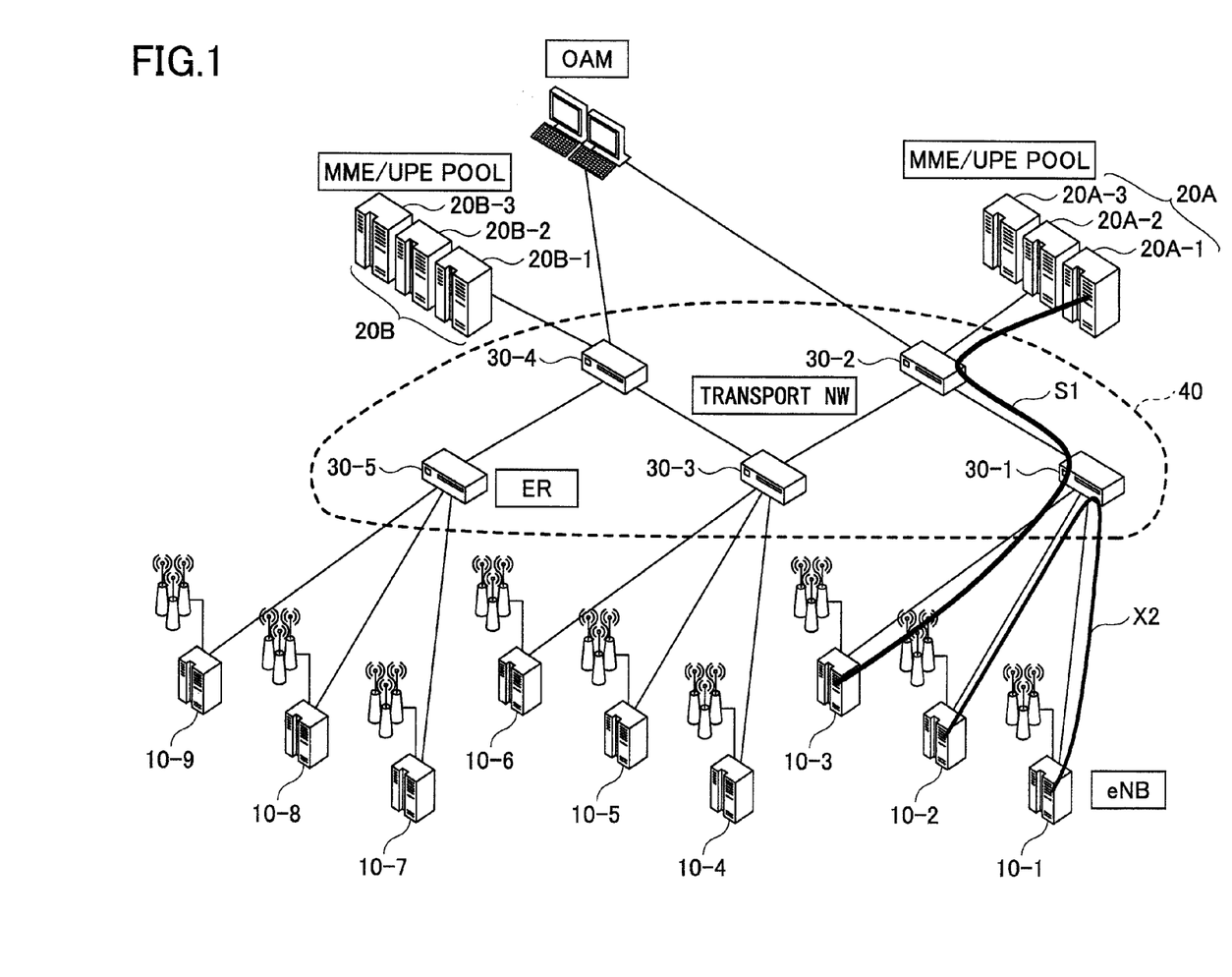
FIG. 1 shows a schematic diagram of a communications network to which the present invention is applicable.

With reference to the accompanying drawings, a description is given below with regard to preferred embodiments of the present invention. FIG. 1 shows a schematic diagram of a self-organizing network to which the present invention is applicable. Multiple radio base stations (eNBs) 10-1 through 10-N are respectively connected to MMEs/UPEs (Mobile Management Entities/User Plane Entities) 20 via a transport network 40. MMEs/UPEs are upper management nodes. In an embodiment of the present invention, multiple MMEs/UPEs (20-1 through 20-3) are grouped into a MME/UPE pool (20A or 20B). Each MME/UPE 20 within the pool is connected to multiple eNBs 10 via the transport network 40. Each eNB 10 is connected to multiple MMEs/UPEs 20 for the purpose of load balancing. Although the MME and the UPE are combined into the MME/UPE in this embodiment, they may be separated into individual units.

The transport network 40 includes routers 30-1 through 30-5. For convenience of the drawing, the routers 30-2 and 30-4 are connected to an OAM (Operation, Administration and Maintenance) server and the MME/UPE pool 20. The routers 30 may be connected to a HLR (home location register) and an IASA (inter-access system anchor) (not shown).

In an embodiment of the present invention, the radio base station (eNB) 10 is a plug-and-play (PnP) node. A logical connection (logical interface) between PnP radio base stations (eNBs) 10 is referred to as an X2 interface, and a logical connection (logical interface) between the PnP radio base station 10 and the upper node (MME/UPE) 20 is referred to as an S1 interface.

When a new PnP base station 10 is plugged into a power supply and powered on, the new PnP base station 10 broadcasts existence of the own PnP base station 10 in a wired or wireless manner. At least one of the existing eNBs 10 or the upper nodes (MMEs/UPEs) 20 which receives broadcast information establishes an initial X2 interface or an initial S1 interface with the new eNB 10. The new eNB 10 receives logical interface information via the initial X2 interface or the initial S1 interface, and then establishes additional S1 interfaces or additional X2 interfaces based on the logical interface information.

With reference to specific embodiments, a description is given below with regard to how to establish the initial X2 interface or the S1 interface and how to establish optimum X2 interfaces or optimum S1 interfaces to extensively cover the network.

First Embodiment

Figure 2:
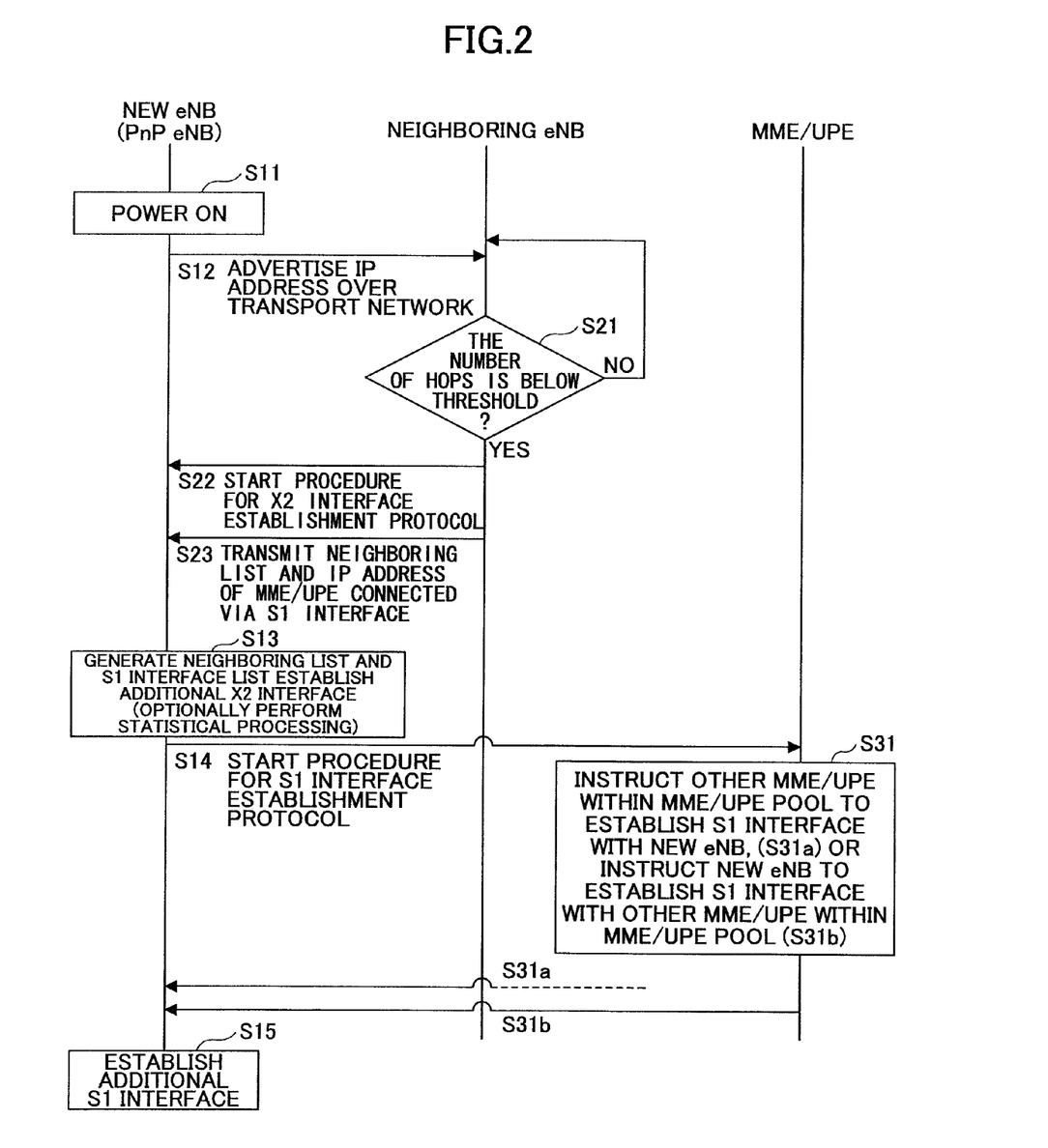
FIG. 2 shows a sequence diagram of an X2/S1 interface establishing method in accordance with a first embodiment.

FIG. 2 shows a sequence diagram of an X2/S1 interface establishing method in accordance with a first embodiment. The new eNB 10 advertises or broadcasts its own IP address over the transport network 40. Each neighboring eNB 10 which receives the IP address establishes an initial X2 interface with the new eNB 10, when the number of hops from the new eNB 10 to the neighboring eNB 10 is below a threshold. Then, the neighboring eNB 10 transmits to the new eNB the neighboring list retained by the neighboring eNB 10, the IP address of the MME/UPE 20 connected via the S1 interface, and the like. The new eNB generates a neighboring list for the new eNB based on received information and establishes an S1 interface with the upper node.

Specifically, when the new eNB is plugged into a power supply and powered on (S11), the new eNB automatically advertises its own IP address over the transport network 40 (S12). The IP address may be statically assigned by an operator. Alternatively, the IP address may be dynamically assigned by a DHCP (Dynamic Host Configuration Protocol) mechanism included in a typical router.

Each neighboring eNB which receives the IP address of the new eNB via the transport network 40 detects the number of hops from the new eNB to the neighboring eNB and determines whether the number of hops is below a threshold (S21). For example, when the eNB 10-1 in FIG. 1 participates in the network and advertises its own IP address over the transport network 40, the number of hops from the eNB 10-1 to the neighboring eNB 10-2 or 10-3 is equal to two. The number of hops from the eNB 10-1 to the eNB 10-4, 10-5, or 10-6 is equal to four. Provided that the threshold T is equal to three (T=3), the eNBs 10-2 and 10-3 start procedures for X2 interface establishment protocol for the new eNB 10-1, since the detected number of hops is below the threshold (S22). On the other hand, the other neighboring eNBs merely wait for the next advertisement, since the detected number of hops is above the threshold.

The threshold may be determined in advance and stored in each eNB 10 under design. Alternatively, the threshold may be packet-transmitted by an application in the new eNB 10-1, when the new eNB 10-1 advertises the IP address.

When the initial X2 interfaces between the new eNB 10-1 and the existing neighboring eNBs 10-2 and 10-3 are established based on the number of hops, each of the neighboring eNBs 10-2 and 10-3 transmits to the new eNB 10-1 the neighboring list retained by the neighboring eNB and the IP address of the upper node (for example, MME/UPE 20A-1) currently connected via the S1 interface (S23). The neighboring list includes a list (first list) of eNBs currently connected via the X2 interfaces. The neighboring list may optionally include a list (second list) of neighboring cells within the wireless broadcast area (handover area). The number of MMEs/UPEs to which the neighboring eNBs 10-2 and 10-3 connect via the S1 interfaces is not limited to one. The neighboring eNBs 10-2 and 10-3 may connect to all the MMEs/UPEs 20A-1 through 20A-3 within the same pool via the S1 interfaces.

The new eNB 10-1 generates a neighboring list for the new eNB 10-1 based on information received from the neighboring eNBs 10-2 and 10-3 via the initial X2 interfaces and establishes additional X2 interfaces with neighboring eNBs, if needed (S13). In addition, the new eNB 10-1 establishes an S1 interface with the upper node (MME/UPE) 20A-1 based on the received IP address of the MME/UPE 20A-1 (S14).

Upon generating the neighboring list (S13), the new eNB 10-1 may perform statistical processing. Depending on the threshold for the number of hops, the new eNB 10-1 may receive many neighboring lists from many neighboring eNBs 10. In this case, the new eNB 10-1 preferentially selects a predetermined number of eNBs which frequently appear in the received neighboring lists and generates the neighboring list for the new eNB 10-1. The eNBs which less frequently appear in the received neighboring lists or the eNBs among which there are less overlaps are considered as nodes which are far from the new eNB 10-1, and thus the new eNB 10-1 may not necessarily establish X2 interfaces.

In the same manner, when the new eNB 10-1 receives many pieces of S1 interface information from many neighboring eNBs, the new eNB 10-1 may perform statistical processing and establish S1 interfaces with MMEs/UPEs which frequently appear in the S1 interface information.

When the S1 interface is established between the new eNB 10-1 and the MME/UPE 20A-1, the MME/UPE 20A-1 instructs other MMEs/UPEs 20A-2 and 20A-3 within the same MME/UPE pool 20A to establish S1 interfaces with the new eNB 10-1 (S31a). Alternatively, the MME/UPE 20A-1 may instruct the new eNB 10-1 to establish S1 interfaces with other MMEs/UPEs 20A-2 and 20A-3 within the same pool 20A (S31b). Subsequently, the S1 interfaces are extended (established) between the new eNB 10-1 and additional upper nodes (MMEs/UPEs) (S15).

The threshold T for the number of hops used in the step S21 may be variable. For example, the threshold T may be initially equal to two (T=2) and, in the case of no or less information from the neighboring eNBs 10, the threshold T may be incremented until sufficient information is available. In this case, every time the threshold T is incremented in the new eNB 10-1, the new eNB 10-1 may packet-transmit the threshold T changed (incremented) by the application over the transport network 40. The new eNB 10-1 may start statistical processing after receiving a predetermined number of neighboring lists.

According to this method, settings of neighboring lists, which are conventionally configured by the operator manually with reference to relationships among neighboring cells, can be automated. In addition, optimum X2 interfaces and S1 interfaces with neighboring eNBs and upper nodes can be established.

Second Embodiment

Figure 3:
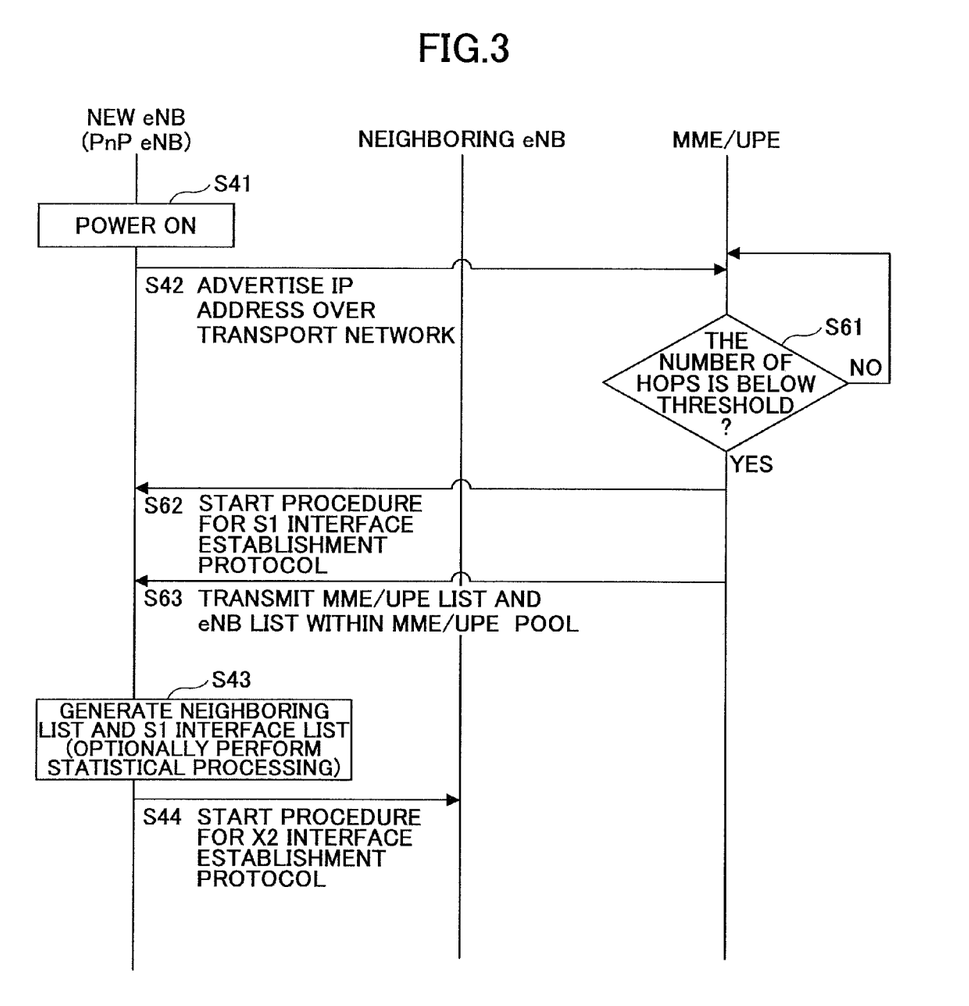
FIG. 3 shows a sequence diagram of an S1/X2 interface establishing method in accordance with a second embodiment.

FIG. 3 shows a sequence diagram of an S1/X2 interface establishing method in accordance with a second embodiment. In the second embodiment, the upper node (MME/UPE) 20 rather than each neighboring eNB receives the IP address of the new eNB which is advertised over the transport network 40 and determines the number of hops. The MME/UPE 20 establishes an S1 interface with the new eNB, when the number of hops is below a threshold.

Specifically, when the new eNB (for example, eNB 10-1) is plugged into a power supply and powered on (S41), the new eNB advertises its own IP address over the transport network 40 (S42). The IP address may be statically assigned by an operator. Alternatively, the IP address may be dynamically assigned by a DHCP (Dynamic Host Configuration Protocol) mechanism included in a typical router.

The MME/UPE 20 which receives the IP address of the new eNB 10-1 via the transport network 40 detects the number of hops from the new eNB to the MME/UPE 20 and determines whether the number of hops is below a threshold (S61). For example, as shown in FIG. 1, the number of hops from the eNB 10-1 to the MME/UPE 20B-1 is equal to three. The number of hops from the eNB 10-1 to the MME/UPE 20B-1 is equal to five. Provided that the threshold T is equal to three (T=3), the MME/UPE 20A-1 establishes an S1 interface with the new eNB 10-1 (S62) and transmits to the new eNB 10-1 the MME/UPE list within the MMP/UPE pool 20A and the eNB list used within the MME/UPE pool 20A (S63). On the other hand, the MME/UPE 20B-1 may wait for the next advertisement without establishing an S1 interface.

The new eNB 10-1 generates a neighboring list and an S1 interface list based on the received information (S43). The new eNB 10-1 may optionally perform statistical processing. Specifically, the new eNB 10-1 preferentially selects eNBs which frequently appear in the eNB list to generate an optimized neighboring list, when the number of existing eNBs within the MME/UPE pool 20A is large. The eNB 10-1 establishes X2 interfaces with neighboring eNBs based on the generated neighboring list and the S1 interface list (S44).

According to this method, the new eNB 10 can automatically establish S1 and X2 interfaces with the upper nodes (MMEs/UPEs 20) and neighboring eNBs, respectively, by means of autonomous operations of the new eNB 10, when the new eNB 10 is physically connected to the network and powered on.

Figure 4:
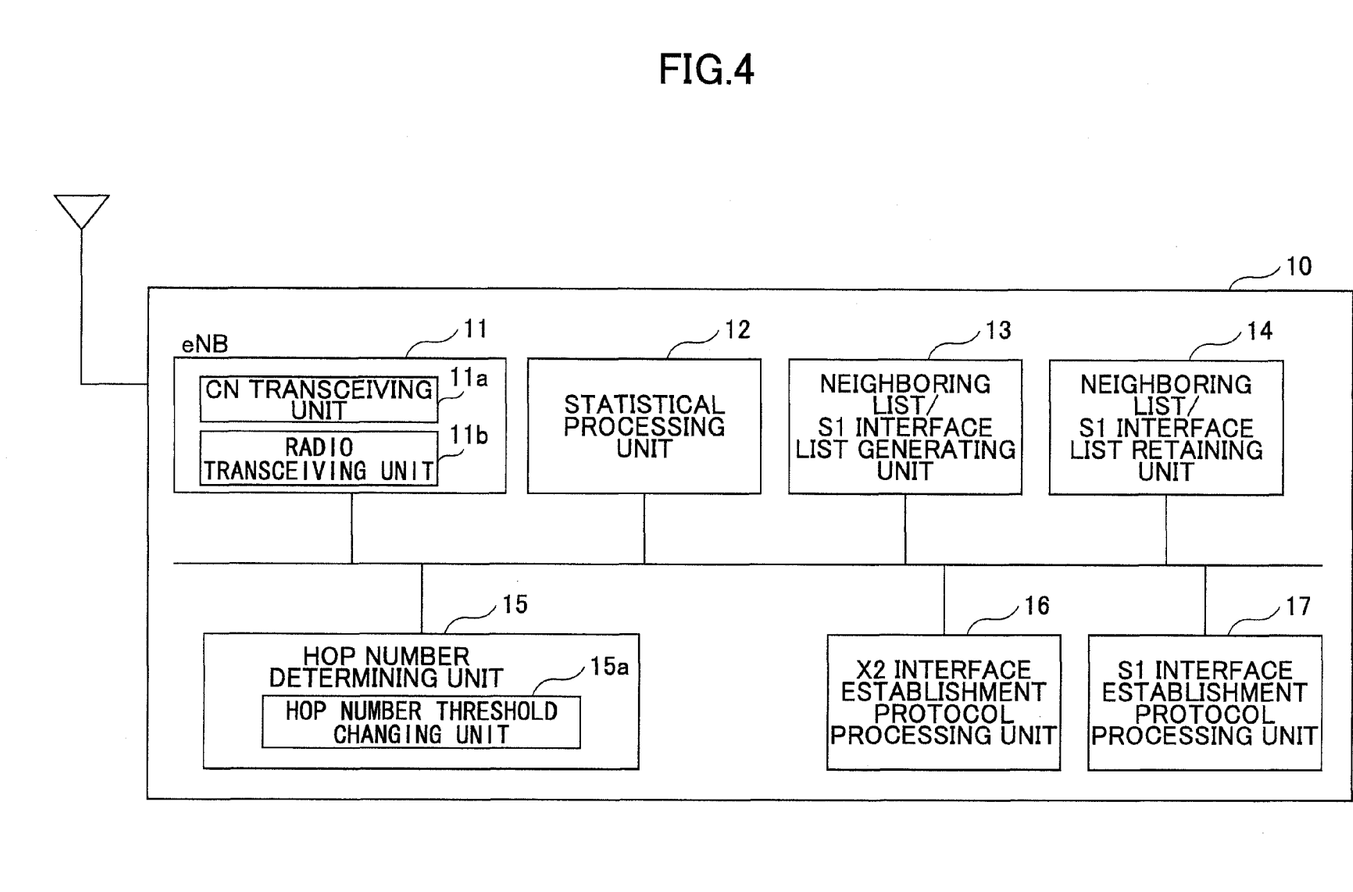
FIG. 4 shows a block diagram of a radio base station (eNB) used in the first and second embodiments.

FIG. 4 shows a block diagram of a radio base station (eNB) 10 used in the network shown in FIG. 1. The eNB 10 can be preferably used in the first and second embodiments.

The radio base station (eNB) 10 includes a transceiving unit 11, a statistical processing unit 12, a neighboring list/S1 interface list generating unit 13, a neighboring list/S1 interface list retaining unit 14, a hop number determining unit 15, an X2 interface establishment protocol processing unit 16, and an S1 interface establishment protocol processing unit 17.

The transceiving unit 11 includes a CN transceiving unit 11a for transmitting and receiving signals over the core network and a radio transceiving unit 11b for transmitting and receiving radio signals to and from mobile terminals (UEs). The CN transceiving unit 11a advertises its own IP address over the transport network 40, when the eNB 10 is physically connected to the network for the first time. The CN transceiving unit 11a receives neighboring lists or multiple pieces of S1 interface information (upper node information) from existing neighboring eNBs or upper nodes (MMEs/UPEs) 20. The CN transceiving unit 11a also receives an IP address which is advertised over the transport network 40 when another new eNB participates in the network.

The statistical processing unit 12 selects eNBs and upper nodes (MMEs/UPEs) which frequently appear in the neighboring lists or S1 interface information, if needed, to statistically process the received neighboring lists and S1 interface information. As described above, the neighboring list may include a list of neighboring cells within the handover area in addition to a list of eNBs connected via the X2 interface.

The neighboring list/S1 interface list generating unit 13 generates a neighboring list and an S1 interface list for the eNB 10 based on the neighboring lists and S1 interface information received by the CN transceiving unit 11a, with reference to the result of the statistical processing, if needed. The S1 interface establishment protocol processing unit 17 establishes S1 interfaces with the upper nodes (MMEs/UPEs 20) in accordance with the S1 interface list.

The neighboring list/S1 interface list retaining unit 14 retains the generated neighboring list and a list of S1 interfaces with the upper nodes (MMEs/UPEs 20). The neighboring list/S1 interface list retaining unit 14 updates the list of S1 interfaces when the eNB 10 establishes S1 interfaces with other MMEs/UPEs 20 within the same MME/UPE pool.

In the case where X2/S1 interfaces are established in accordance with the first embodiment, when another new eNB participates in the network and the eNB 10 receives the IP address of the new eNB over the transport network 40, the hop number determining unit 15 determines the number of hops from the new eNB to the eNB 10. The hop number determining unit 15 also determines whether the number of hops is below a predetermined threshold. If the number of hops is below the predetermined threshold, the X2 interface establishment protocol processing unit 16 establishes an X2 interface with the new eNB and transmits from the CN transceiving unit 11a information retained by the neighboring list/S1 interface list retaining unit 14.

In the case where the eNB 10 participates in the network as a new eNB, a hop number threshold changing unit 15a changes the threshold when neighboring lists received from neighboring eNBs are not sufficient. The changed threshold is transmitted from the CN transceiving unit 11a along with the IP address. In the case where the eNB is the existing eNB, the hop number threshold changing unit 15a updates the threshold for the number of hops upon receiving notification for changing the threshold from another new eNB.

In the case where the MME/UPE 20 determines the number of hops in accordance with the second embodiment, on the other hand, the neighboring list/S1 interface list generating unit 13 generates a neighboring list and an S1 interface list with reference to the MME/UPE list within the pool and the eNB list within the pool which are transmitted from the MME/UPE 20. The X2 interface establishment protocol processing unit 16 and the S1 interface establishment protocol processing unit 17 establish X2 and S1 interfaces with the existing eNBs and MME/UPE 20, respectively, based on the generated lists.

In this manner, the radio base station (eNB) 10 can participate in the network by means of autonomous operations.

Figure 5:
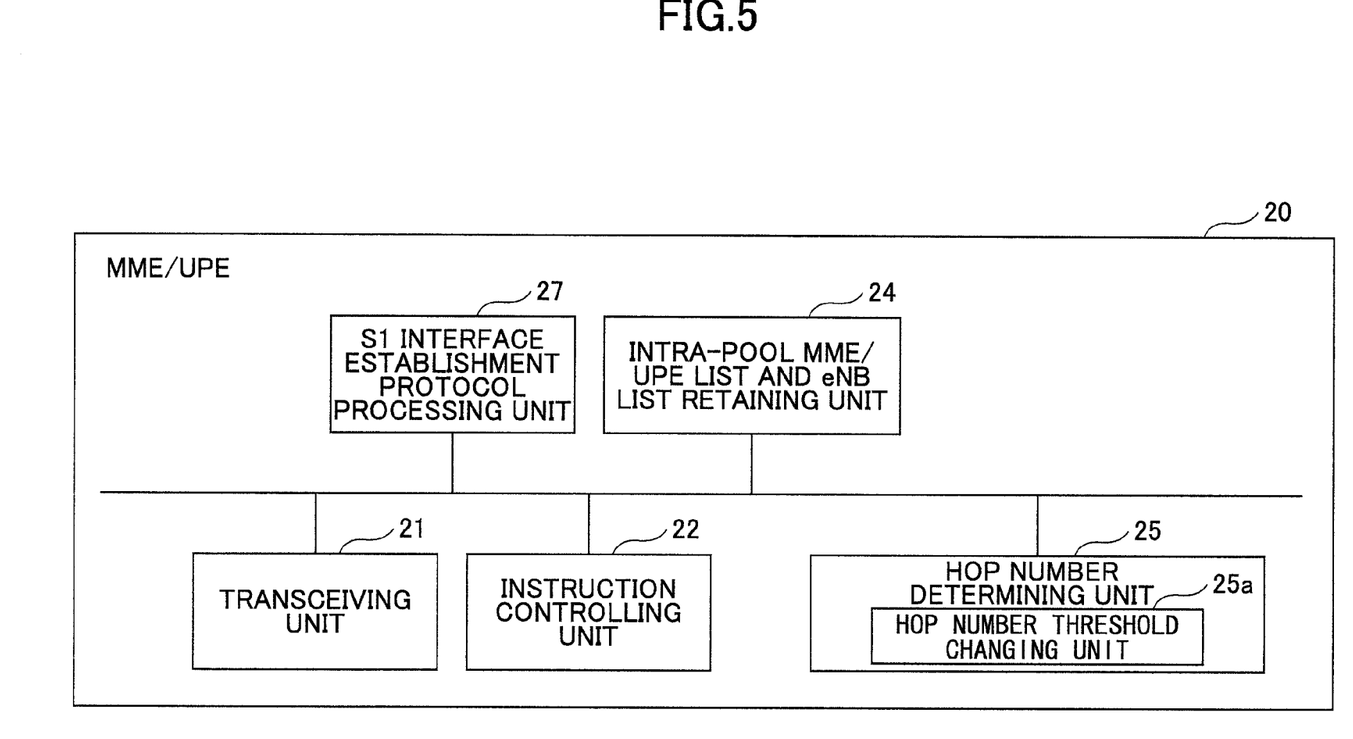
FIG. 5 shows a block diagram of an upper node (MME/UPE) used in the first and second embodiments.

FIG. 5 shows a block diagram of an upper node (MME/UPE) 20 used in the network shown in FIG. 1. The MME/UPE 20 can be preferably used in the first and second embodiments.

The MME/UPE 20 includes a transceiving unit 21, an instruction controlling unit 22, a hop number determining unit 25, an S1 interface establishment protocol processing unit 27, and an intra-pool MME/UPE list and eNB list retaining unit 24. In the first embodiment, when an S1 interface is established between the MME/UPE 20 and the new eNB 10-1, the instruction controlling unit 22 instructs other MMEs/UPEs 20 within the same pool to establish S1 interfaces with the new eNB 10-1. Alternatively, the MME/UPE 20 may transmit to the new eNB 10-1 IP addresses of the MMEs/UPEs 20 within the same pool with reference to the intra-pool MME/UPE list and eNB list retaining unit 24, and then instruct the new eNB 10-1 to establish S1 interfaces with additional MMEs/UPEs 20. This instruction is transmitted from the transceiving unit 21.

In the second embodiment, when the transceiving unit 21 receives the IP address of the new eNB 10-1 which is advertised over the transport network 40, the hop number determining unit 25 determines the number of hops from the new eNB 10-1 to the MME/UPE 20. The hop number determining unit 25 also determines whether the number of hops is below a threshold. A hop number threshold changing unit 25a changes the threshold for the number of hops upon receiving notification for changing the threshold from the new eNB 10-1. If the number of hops is below the threshold, the S1 interface establishment protocol processing unit 27 starts procedures for S1 interface establishment protocol for the new eNB 10-1. When an S1 interface is established, the transceiving unit 21 transmits to the new eNB 10-1 information retained by the intra-pool MME/UPE list and eNB list retaining unit 24.

In this manner, the MME/UPE 20 can quickly establish an S1 interface with a new eNB, while establishing S1 interfaces with other MMEs/UPEs within the same pool to maintain load balancing within the network.

Third Embodiment

Figure 6:
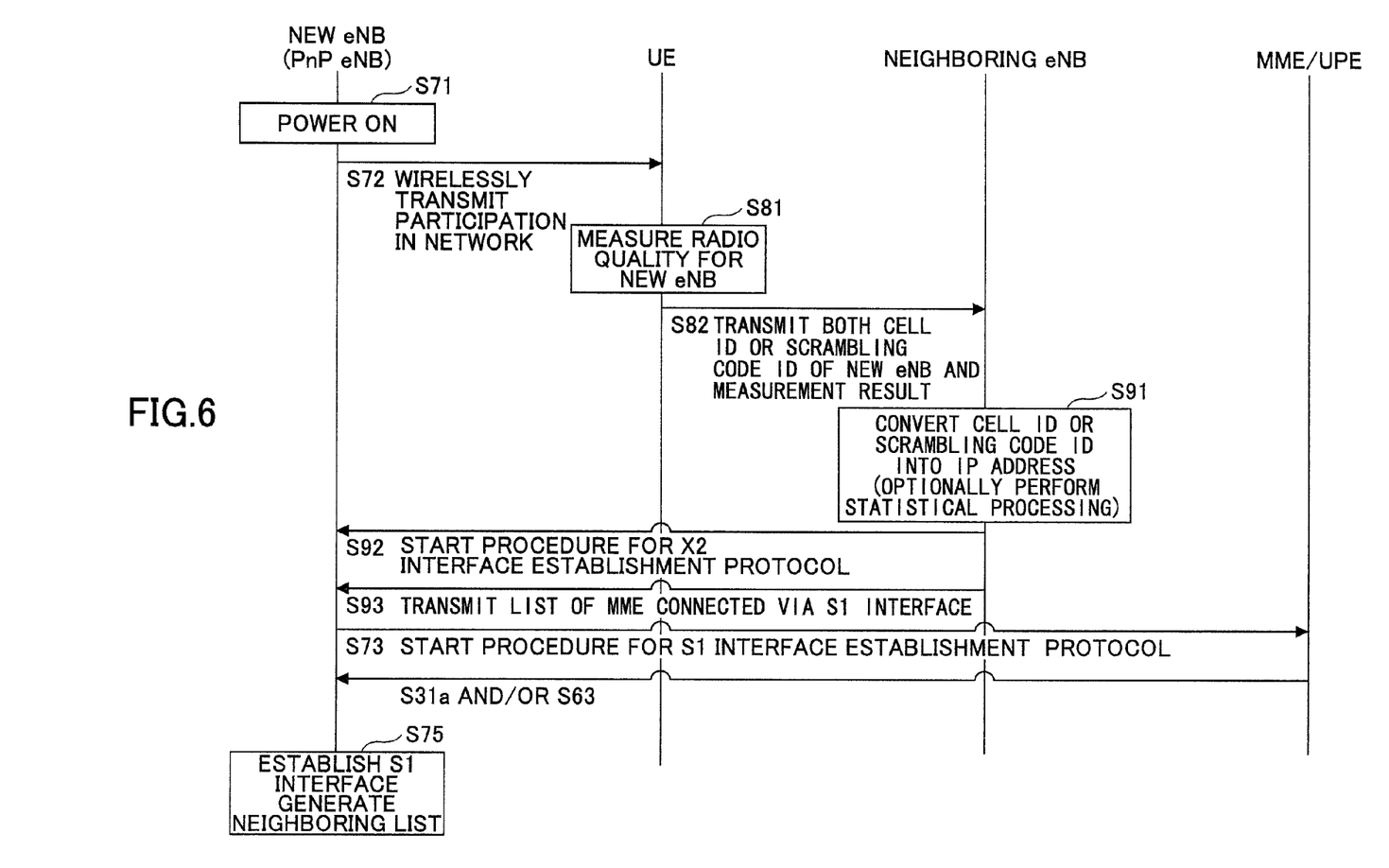
FIG. 6 shows a sequence diagram of a first S1 interface establishing method in accordance with a third embodiment.

FIG. 6 shows a sequence diagram of a first S1 interface establishing method in accordance with a third embodiment. In the third embodiment, an S1 interface is established based on measurement by the mobile terminal UE.

When a new eNB is plugged into a power supply and powered on (S71), the new eNB wirelessly broadcasts participation in the network (S72). For example, the broadcast signal includes a reference signal and broadcast information. The broadcast information includes radio identification information (for example, a cell ID) of the new eNB. The reference signal and broadcast information may be scrambled with a cell-specific scrambling code. The cell ID or the scrambling code ID may be defined in the system in advance or may be dynamically assigned.

The broadcast signal is received by one or more mobile terminals (UEs) (not shown) within the cell. The mobile terminal (UE) measures radio quality for the new eNB based on a received power level, a received SIR, path loss, or the like of the broadcast signal (S81). The mobile terminal UE transmits both the cell ID or the scrambling code ID of the new eNB and the measurement result on the uplink (S82). For example, when one or more mobile terminals situated close to the boundary between areas of the neighboring eNBs 10-2 and 10-4 in FIG. 1 receives the broadcast signal which indicates participation of the new eNB 10-1, the existing neighboring eNBs 10-2 and 10-4 receive the cell ID and the measurement result from these mobile terminals.

Each of the neighboring eNBs 10-2 and 10-4 converts the cell ID or the scrambling code ID into an IP address (S91). Specifically, the neighboring eNB may query the OAM server or DNS (domain name server) and retrieve the IP address of the new eNB in order to convert the cell ID or the scrambling code ID into the IP address. The neighboring eNB may perform statistical processing of received values (measurement results of radio quality) from multiple mobile terminals before retrieving the IP address of the new eNB 10-1. For example, when average radio quality determined by the statistical processing is below a predetermined level, the neighboring eNB may not retrieve the IP address of the new eNB. This means that the neighboring eNB is far from the new eNB, and thus the neighboring eNB need not establish an X2 interface. For example, when radio quality for the new eNB determined by the statistical processing in the neighboring eNB 10-2 is above the predetermined level and radio quality determined by the statistical processing in the neighboring eNB 10-4 is below the predetermined level, the neighboring eNB 10-2 retrieves the IP address of the new eNB 10-1 and starts procedures for X2 interface establishment protocol for the new eNB 10-1 (S92). On the other hand, the neighboring eNB 10-4 may terminate the process without converting the cell ID or the scrambling code ID into an IP address.

The neighboring eNB 10-2 transmits to the new eNB 10-1, via the established initial X2 interface, the list of MMEs/UPEs 20 currently connected via S1 interfaces (S93). For example, this list includes MMEs/UPEs 20A-1, 20A-2, and 20A-3 within the pool 20A. The new eNB 10-1 starts procedures for S1 interface establishment protocol for any one of MMEs/UPEs (S73). After the S1 interface is established, other MMEs/UPEs within the pool may establish S1 interfaces with the new eNB 10-1, as shown in the step S31a in FIG. 2 (first embodiment). Alternatively, the eNB list used within the MME/UPE pool 20A may be transmitted to the new eNB 10-1, as shown in the step S63 in FIG. 3 (second embodiment), so that the new eNB 10-1 can establish additional S1 interfaces and generate a neighboring list.

Figure 7:
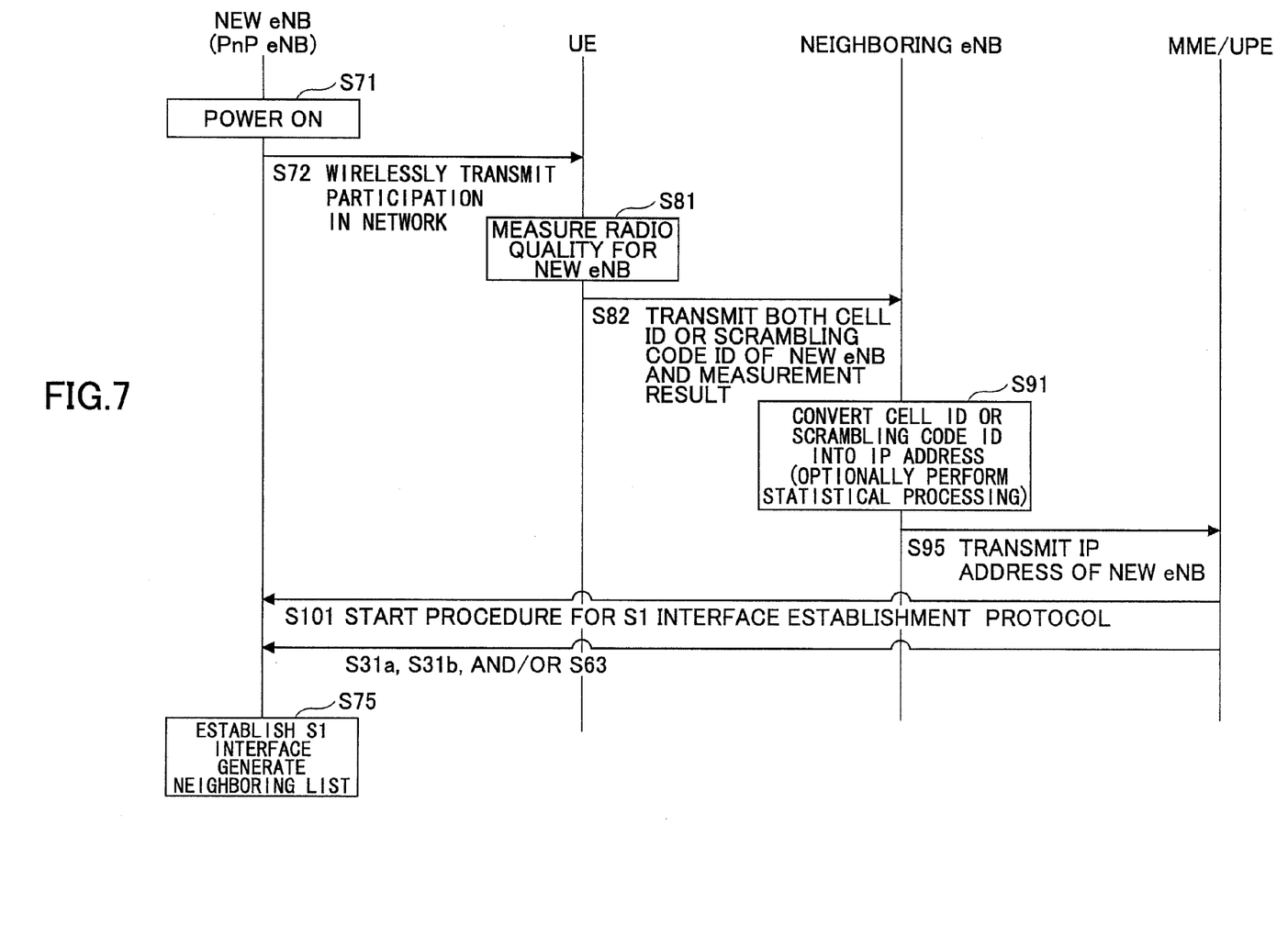
FIG. 7 shows a sequence diagram of a second S1 interface establishing method in accordance with the third embodiment.

FIG. 7 shows a sequence diagram of a second S1 interface establishing method in accordance with the third embodiment. The steps of power-on of the new eNB (S71) thorough retrieval of the IP address in the neighboring eNB (S91) are the same as the steps of the first S1 interface establishing method. The neighboring eNB (for example, eNB 10-2) transmits the retrieved IP address of the new eNB to the upper node (for example, MME/UPE 20A-2) connected via the S1 interface (S95). In this case, the neighboring eNB may transmit the IP address of the new eNB 10-1, only when average radio quality determined by the statistical processing is above the predetermined level.

The MME/UPA 20A-1 which receives the IP address starts procedures for S1 interface establishment protocol for the new eNB 10-1 (S101). The MME/UPE 20A-1 may transmit to the new eNB 10-1, via the established S1 interface, the MME/UPE list and eNB list used within the MME/UPE pool (S63 in the second embodiment). Alternatively, the MME/UPE 20A-1 may instruct other MMEs/UPEs within the same MME/UPE pool to establish S1 interfaces with the new eNB 10-1 (S31a) or instruct the new eNB to establish S1 interfaces with other MMEs/UPEs within the same pool (S31b). Consequently, the new eNB can establish additional S1 interfaces and generate a neighboring list (S75).

According to the first and second S1 interface establishing methods of the third embodiment, the broadcast signal is wirelessly transmitted upon power-on of the new eNB, and then the mobile terminal measures radio quality of the broadcast signal, so that optimum S1 interfaces (S1 network) can be autonomously established.

Figure 8:
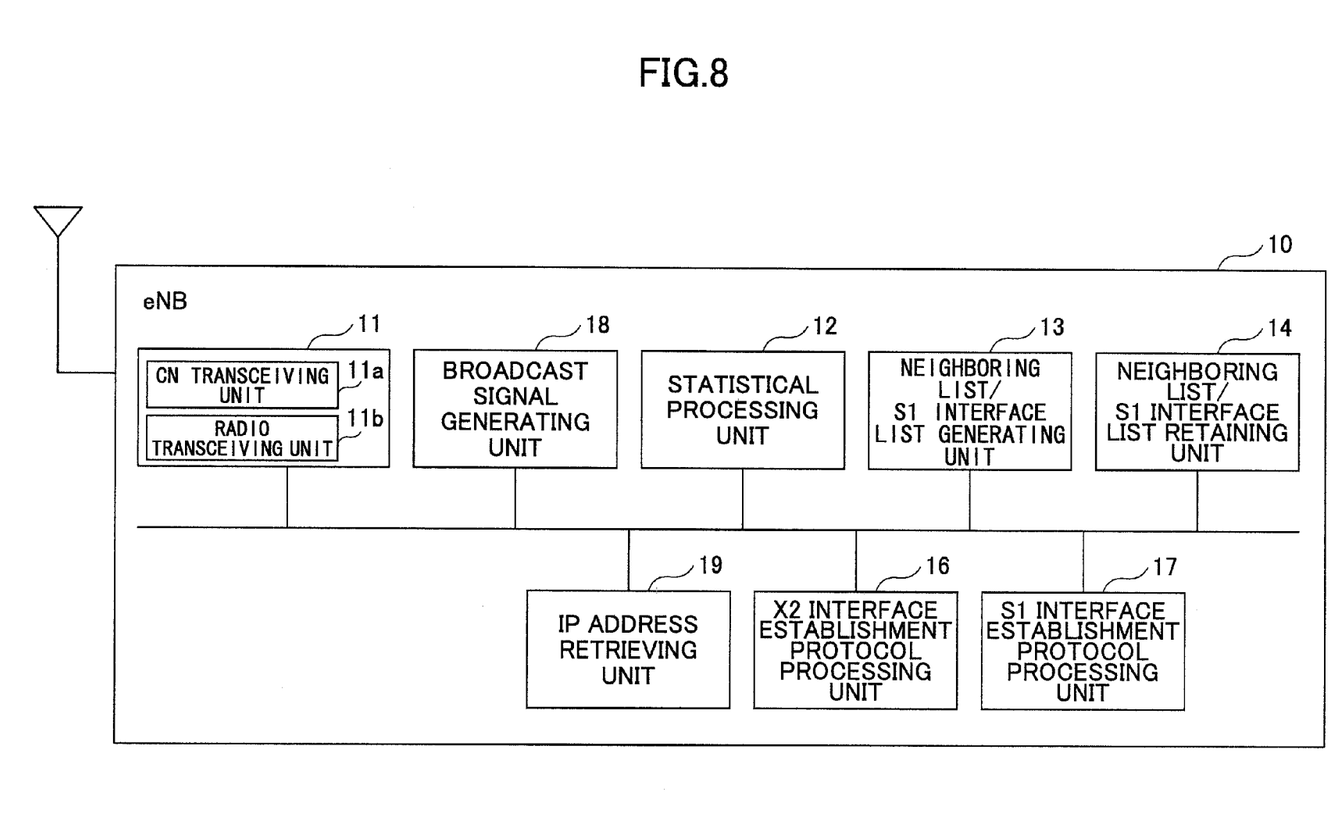
FIG. 8 shows a block diagram of a radio base station (eNB) used in the third embodiment.

FIG. 8 shows a block diagram of a radio base station (eNB) 10 used in the third embodiment. The radio base station (eNB) 10 includes a transceiving unit 11, a statistical processing unit 12, a neighboring list/S1 interface list generating unit 13, a neighboring list/S1 interface list retaining unit 14, an X2 interface establishment protocol processing unit 16, an S1 interface establishment protocol processing unit 17, a broadcast signal generating unit 18, and an IP address retrieving unit 19. The transceiving unit 11 includes a CN transceiving unit 11a for transmitting and receiving signals over the core network and a radio transceiving unit 11b for transmitting and receiving radio signals to and from mobile terminals.

In the case where the radio base station 10 corresponds to the new eNB 10-1, the broadcast signal generating unit 18 generates a broadcast signal including the cell ID or the scrambling code ID upon power-on and the radio transceiving unit 11b transmits the broadcast signal. According the first S1 interface establishing method (FIG. 6), the CN transceiving unit 11a receives the MME/UPE list (or S1 interface list) retained by the neighboring eNB. The S1 interface establishment protocol processing unit 17 establishes an initial S1 interface with one of MMEs/UPEs included in the received MME/UPE list. Upon receiving the MME/UPE list and the eNB list within the same pool from the MME/UPE connected via the initial S1 interface, the neighboring list/S1 interface list generating unit 13 generates a neighboring list for the radio base station 10 and establishes additional S1 interfaces. The neighboring list and the S1 interface list are retained by the neighboring list/S1 interface list retaining unit 14.

In the case of the second S1 interface establishing method, the radio base station merely waits for the MME/UPE list and the eNB list within the pool from an appropriate MME/UPE after wirelessly transmitting the broadcast signal. Then, the S1 interface establishment protocol processing unit 17 establishes additional S1 interfaces and the neighboring list/S1 interface list generating unit 13 generates a neighboring list and updates the S1 interface list.

In the case where the radio base station (eNB) corresponds to the neighboring eNB 10-2, the radio transceiving unit 11b receives the cell ID of the new eNB and the measurement results from one or more mobile terminals. The statistical processing unit 12 performs statistical processing of the received measurement results, if needed. When radio quality for the new eNB determined by the statistical processing is above the predetermined level, the IP address retrieving unit 19 converts the cell ID or the scrambling code ID into an IP address of the new eNB. According the first S1 interface establishing method, the X2 interface establishment protocol processing unit 16 establishes an X2 interface with the new eNB based on the retrieved IP address and transmits to the new eNB the MME/UPE list for the radio base station with reference to the neighboring list/S1 interface list retaining unit 14. According to the second S1 interface establishing method, when radio quality for the new eNB determined by the statistical processing is above the predetermined level, the radio base station transmits the IP address of the new eNB to MMEs/UPEs 20 currently connected via S1 interfaces.

According to this radio base station (eNB) 10, the broadcast signal is wirelessly transmitted when the new eNB 10 is plugged into a power supply and powered on, so that X2 interfaces and S1 interfaces with optimum neighboring eNBs and upper nodes (MMEs/UPEs) can be autonomously established based on measurement by the mobile terminal UE.

It should be noted that the MME/UPE 20 in accordance with the third embodiment is the same as the MME/UPE shown in FIG. 5, except that the hop number determining unit 25 is removed.

According to the first through third embodiments, X2 logical interfaces and S1 logical interfaces, which are conventionally configured by the operator manually with reference to relationships among neighboring cells, can be automatically established.

This international patent application is based on Japanese Priority Application No. 2007-008541 filed on Jan. 17, 2007, the entire contents of which are incorporated herein by reference.

The invention claimed is:

1. A logical interface establishing method, comprising:
by a new radio base station which is installed in a network, advertising an IP address of the new radio base station over a transport network;
by an existing radio base station or a Mobility Management Entity/User Plane Entity (MME/UPE) which receives the IP address, detecting the number of hops from the new radio base station to the existing radio base station or the MME/UPE;
establishing an X2 interface between the existing radio base station and the new radio base station and establishing an S1 interface between the MME/UPE and the new radio base station, when the detected number of hops is below a predetermined threshold;
by the new radio base station, receiving logical interface information retained by the existing radio base station or the MME/UPE after the X2 interface and the S1 interface are established; and
by the new radio base station, selecting a predetermined number of existing radio base stations which frequently appear in neighboring list information included in the logical interface information, when the logical interface information is received from one or more existing radio base stations or one or more MMEs/UPEs;
by multiple MMEs/UPEs, configuring a pool; and
by one of the MMEs/UPEs within the pool, transmitting a list of other MMEs/UPEs within the pool to the new radio base station and instructing the other MMEs/UPEs to establish additional logical interfaces with the new radio base station, when the IP address of the new radio base station is received by the one of the MMEs/UPEs.

2. The logical interface establishing method as claimed in claim 1, wherein:
the new radio base station is a plug-and-play radio base station, and
the new radio base station automatically advertises an IP address of the new radio base station over the transport network after power-on.

3. The logical interface establishing method as claimed in claim 1, further comprising:
extending the X2 interface and the S1 interface established for the new radio base station based on the logical interface information.

4. The logical interface establishing method as claimed in claim 1, further comprising:
by one of the MMEs/UPEs within the pool, instructing other MMEs/UPEs within the pool to establish additional logical interfaces with the new radio base station, when the IP address of the new radio base station is received by the one of the MMEs/UPEs.

5. A logical interface establishing method, comprising:
from a new radio base station which is installed in a network, wirelessly transmitting a broadcast signal for a notification of existence of the new radio base station;
by a mobile terminal which receives the broadcast signal, measuring radio quality for the new radio base station;
transmitting a measurement result and radio identification information of the new radio base station included in the broadcast signal from the mobile terminal to an existing radio base station;
by the existing radio base station, converting the radio identification information of the new radio base station into an IP address, when average radio quality determined from measurement results of radio quality received from one or more mobile terminals is above a predetermined threshold;
establishing an S1 interface between the new radio base station and a Mobility Management Entity/User Plane Entity (MME/UPE) based on the IP address;
transmitting logical interface information retained by the existing radio base station from the existing radio base station to the new radio base station based on the IP address;
establishing the S1 interface between the new radio base station and the MME/UPE based on the logical interface information;
by multiple MMEs/UPEs, configuring a pool; and
by one of the MMEs/UPEs within the pool, transmitting a list of other MMEs/UPEs within the pool to the new radio base station and instructing the other MMEs/UPEs to establish additional logical interfaces with the new radio base station, when the IP address of the new radio base station is received by the one of the MMEs/UPEs.

6. The logical interface establishing method as claimed in claim 5, further comprising:
transmitting the IP address from the existing radio base station to the MME/UPE;
and establishing the S1 interface between the MME/UPE and the new radio base station based on the IP address.

7. A radio base station, comprising:
a transceiving unit configured to advertise an IP address of the radio base station over a transport network upon participating in a network and to receive logical interface information retained by an existing radio base station or a Mobility Management Entity/User Plane Entity (MME/UPE) from the existing radio base station or the MME/UPE via the transport network;
a processor coupled with memory configured:
to generate logical interface information for the radio base station based on the received logical interface information,
to establish an X2 interface with the existing radio base station and an S1 interface with the MME/UPE based on the generated logical interface information;
to select a predetermined number of existing radio base stations which frequently appear in neighboring list information included in the logical interface information, when the logical interface information is received from one or more existing radio base stations or one or more MMEs/UPEs; wherein:
by multiple MMEs/UPEs, configuring a pool; and
by one of the MMEs/UPEs within the pool, transmitting a list of other MMEs/UPEs within the pool to the new radio base station and instructing the other MMEs/UPEs to establish additional logical interfaces with the new radio base station, when the IP address of the new radio base station is received by the one of the MMEs/UPEs.

\* \* \* \* \*